(12) United States Patent
Kontola (10) Patent No.: US 6,792,035 B2
(45) Date of Patent: Sep. 14, 2004

(54) METHOD AND APPARATUS FOR REDUCING THE EFFECT OF MULTIPATH PROPAGATION IN A RECEIVED SIGNAL

(75) Inventor: Ilkka Kontola, Julkujärvi (FI)

(73) Assignee: Nokia Mobile Phones, Ltd., Espoo (FI)

(*) Notice: Subject to any disclaimer, the term of this patent is extended or adjusted under 35 U.S.C. 154(b) by 489 days.

(21) Appl. No.: 09/745,081

(22) Filed: Dec. 20, 2000

(65) Prior Publication Data

US 2001/0012315 A1 Aug. 9, 2001

(30) Foreign Application Priority Data

Dec. 21, 1999 (FI) .............................................. 19992753

(51) Int. Cl.$^7$ ........................... H04B 15/00; H04K 1/00; H04L 27/30
(52) U.S. Cl. ........................ 375/148; 375/150; 375/144
(58) Field of Search ................................ 375/285, 130, 375/140, 142, 150, 346, 348, 350, 343, 144, 147, 148; 370/210

(56) References Cited

U.S. PATENT DOCUMENTS

| | | | | |
|---|---|---|---|---|
| 5,285,474 A | * | 2/1994 | Chow et al. | 375/231 |
| 5,615,232 A | | 3/1997 | Van Nee | 375/346 |
| 5,648,983 A | | 7/1997 | Kostic et al. | 375/206 |
| 5,812,090 A | | 9/1998 | Chevalier et al. | 342/378 |
| 5,862,226 A | * | 1/1999 | Cervini | 381/2 |
| 6,122,015 A | * | 9/2000 | Al-Dhahir et al. | 348/614 |
| 6,259,729 B1 | * | 7/2001 | Seki | 375/231 |

OTHER PUBLICATIONS

"Frequency–Domain Delay Distortion Equalization—The Complex Spectrum Regeneration Method", Masami Akaike, 1998 IEEE, Proceedings of Radio and Wireless Conference, pp. 249–252.

"Joint Multipath–Doppler Diversity in Mobile Wireless Communications", Akbar M. Sayeed, 1999, IEEE Transactions On Communications, vol. 47, No. 1, pp. 123–132.

* cited by examiner

Primary Examiner—Jean B. Corrielus
(74) Attorney, Agent, or Firm—Perman & Green, LLP (57) ABSTRACT

The invention relates to a method for reducing the effect of multipath propagation in a receiver (1) in which a code-modulated spread spectrum signal is received. In the method, at least one reference code (r(x)) corresponding to a code used in modulation is used to form at least two reference signals with different phases. Correlation between a received signal and each reference signal is performed to form correlation values. The method also comprises the steps of forming a divider function and performing at least a deconvolution step, in which a first time-to-frequency transformation is performed on the corelation results to form first transform results, and the first transform results are divided by the values of the divider function to form a division result. The invention also relates to a receiver (1) for receiving a code modulated spread spectrum signal, and an electronic device (24) comprising at least a positioning receiver (1) with count (2) for receiving a code modulated spread spectrum signal.

56 Claims, 9 Drawing Sheets

METHOD AND APPARATUS FOR REDUCING THE EFFECT OF MULTIPATH PROPAGATION IN A RECEIVED SIGNAL

FIELD OF THE INVENTION

The present invention relates to a method for reducing the effects of multipath propagation in a receiver.

BACKGROUND OF THE INVENTION

The GPS system (Global Positioning System) is a positioning system that comprises more than 30 satellites, of which a maximum of 12 are simultaneously visible to a receiver Among other things, the satellites transmit information about the satellite's orbit (Ephemeris data), as well as information about the time according to the satellite's clock. A positioning receiver normally determines its position in by calculating the time of propagation of signals transmitted simultaneously from several satellites in the positioning system to the receiver. To determine its position, the receiver must typically receive the signal of at least four satellites within its sight.

Each satellite of the GPS system transmits a so-called L1 signal at a carrier frequency of 1575.42 MHz. This frequency is also denoted as $154f_0$, where $f_0=10.23$ MHz. Additionally, the satellites transmit an L2 signal at a carrier frequency of 1227.6 MHz, i.e. $120f_0$. In the satellite, these signals are modulated with at least one pseudo-random sequence. The pseudo-random sequence is different for each satellite. As a result of the modulation, a code-modulated wideband signal is generated. This modulation technique makes it possible to discriminate the signals transmitted from different satellites at the receiver, even though the carrier frequencies used in the transmission are substantially the same. This modulation technique is called code division multiple access (CDMA). In each satellite, the pseudo-random sequence used to modulate the L1 signal is e.g. a so-called C/A code (Coarse/Acquisition code), which is a Gold code. Each GPS satellite transmits a signal using an individual C/A code. The codes are formed as a modulo-2 sum of two 1023-bit binary sequences. The first binary sequence G1 is formed using the polynomial $X^{10}+X^3+1$, and the second binary sequence G2 is formed by delaying the polynomial $X^{10}+X^9+X^8+X^6+X^3+X^2+1$ in such a way that the delay is different for each satellite. This arrangement makes it possible for different C/A codes to be produced with an identical code generator. The C/A codes are thus binary codes, whose chipping rate is 1.023 MHz in the GPS system. The C/A code comprises 1023 chips, wherein the duration of one repetition of the code is 1 ms. The carrier of the L1 signal is further modulated with navigation information at a bit rate of 50 bit/s. The navigation information comprises information about the "health" of the satellite, its orbit, time data, etc.

During their operation, the satellites monitor the condition of their equipment. For example, the satellites may use so-called watch-dog operations to detect and report possible faults in the equipment. The errors and malfunctions may be transitory or longer lasting. On the basis of the health data, some of the faults can possibly be compensated for, or the information transmitted by a malfunctioning satellite can be totally disregarded. Furthermore, in a situation in which the signal of more than four satellites can be received, different satellites can be weighted differently on the basis of the health data. Thus, it is possible to minimize the effect of errors on the measurements possibly caused by satellites which seem unreliable.

To detect the satellite signals and to identify the satellites, the receiver must perform synchronization, in which the receiver searches in turn for the signal of each satellite and attempts to synchronize and lock to the signal so that the data transmitted with the signal can be received and demodulated.

The positioning receiver must perform synchronization e.g. when the receiver is switched on and also in a situation where the receiver has not been able to receive the signal of any satellite for a long time. Such a situation can easily arise e.g. in portable devices, because the device is moving and the antenna of the device is not always in an optimal position in relation to the satellites, which reduces the strength of the signal arriving at the receiver. Moreover, in urban areas, buildings affect the signal to be received, and furthermore, so-called multipath propagation can occur, wherein the transmitted signal arrives at the receiver via different paths, e.g. directly from the satellite (line-of-sight) and also reflected from buildings. Multipath propagation causes the same signal to be received as several signals with different phases.

Multipath propagation may cause inaccuracies in the positioning e.g. because the distance travelled by a multipath propagated signal is not equal to the straight-line distance between the transmitter and the receiver. Thus, if the receiver cannot distinguish between the direct signal and multipath-propagated components, positioning accuracy will be reduced.

The amplitude of a multipath-propagated signal is influenced by several factors, such as the reflective properties of the surfaces causing reflection of the radio signals, the distance travelled by the signal, and the number of reflections. Multipath propagation changes continuously with time. In general, both movement of the receiver and movement of the satellites causes the strength, phase, number, etc. of the multipath-propagated signals arriving at the receiver to change continuously. Thus, changes are also caused in the signal received by the receiver. For this reason, the receiver must try, after synchronization, to remain continuously locked to the signal of each satellite from which information is received e.g. for positioning. In the receiver, the code phase is calculated very frequently, and if necessary the oscillator is adjusted in such a way that the receiver remains synchronized.

The positioning arrangement has two primary functions:
1. to calculate the pseudo-range between the receiver and the different GPS satellites, and
2. to determine the position of the receiver using the calculated pseudo-ranges and information about the position of the satellites. Information about the position each satellite can be calculated on the basis of the Ephemeris and time correction data received from the satellites.

The distances to the satellites are called pseudo-ranges, because the time is not accurately known at the receiver. Thus, determinations of position and time are repeated, until a sufficient accuracy has been achieved with respect to time and position. Because time is not known with absolute precision, the position and time must be determined by linearizing a set of equations for each new iteration. The pseudo-range can be calculated by measuring the mutual, apparent propagation delays of the different satellite signals.

Almost all known GPS receivers use correlation methods to calculate distances. In a positioning receiver, the pseudo-random sequences of different satellites are stored or generated locally. A received signal is down-converted to an intermediate frequency, after which the receiver multiplies the received signal with a stored pseudo-random sequence. The signal obtained as a result of the multiplication is integrated or low-pass filtered, wherein the result provides information about whether the received signal contained a signal transmitted by a satellite. The multiplication is repeated in the receiver so that each time, the phase of the pseudo-random sequence stored in the receiver is shifted. In other words, a cross-correlation is performed between the received signal and the pseudo-random sequence generated/ stored in the receiver. In a situation where there is no multipath propagation, the correct code phase is deduced from the correlation result preferably in such a way that when the correlation result is the greatest, the correct code phase has been found. The receiver is then correctly synchronized with the received signal. On the other hand, in a situation where multipath propagation is present, it is more difficult to determine the correct code phase.

After synchronization with the code, fine tuning of the frequency and phase-locking are performed. The correlation result also reveals the information transmitted in the GPS signal; that is, the signal in question is a demodulated signal.

The above-mentioned synchronization and frequency tuning process must be repeated for each satellite signal received at the receiver. Consequently, this process consumes a considerable amount of time, particularly in a situation where the signals to be received are weak. To accelerate this process, some prior art receivers use several correlators, making it possible to search for several correlation peaks at the same time.

In prior art receivers, attempts have been also made to reduce the influence of multipath propagation, primarily on the basis of three different principles. The first principle is based on filtering using filters having a long time constant. This is based on the assumption that the expected value of the estimation error caused by multipath propagation is zero. However, this is not completely correct, and therefore, even an estimate filtered for a long time remains inaccurate. According to the second principle, additional correlators are used to determine the cross-correlation function of the received signal and the locally generated code, wherein it is possible to evaluate the influence of multipath propagation on the received signal on the basis of features of the correlation function. In the third principle, three correlators located within a narrow code phase range are used, placed at intervals of e.g. 0.1 chips. On the basis of the information formed by these three correlators, an attempt is made to determine the code phase of the signal. United States patent U.S. Pat. No. 5,615,232 discloses a solution that applies said second principle.

SUMMARY OF THE INVENTION

It is an aim of the present invention to provide a receiver in which the effect of multipath propagation is reduced enabling a directly received signal to be identified from multipath propagated signals. The invention is particularly suitable for use in positioning receivers, but is also applicable in other receivers, preferably CDMA receivers, where the receiver must be synchronized and locked to a spread spectrum signal. The invention is based on performing a frequency domain deconvolution on the signals formed by several correlators located within a narrow code phase range which represent a sampled cross-correlation function. The deconvolution is performed using a cross-correlation function model free of multipath propagation, and after this the code phase resolution is improved by interpolation. Deconvolution is performed using the following approach: samples of the cross-correlation function are transformed into the frequency domain and are divided by a frequency domain model of the cross-correlation function, in such a way that division by zero is prevented by replacing values having an absolute value less than a certain threshold value with said threshold value. Interpolation is performed by adding filler values, preferably zeros, to the frequency domain representation of the sample vector before transformation back to the time domain. In a method according to a preferred embodiment of the invention, a frequency analysis step is also performed, in which an analysis matrix formed by the time-to-frequency transform is analysed. This makes it possible to detect both the code phase and the frequency deviation of a multipath-propagated signal.

The present invention provides considerable advantages compared with prior art methods and receivers. Using the method according to the invention, the detection of multipath-propagated signals is improved, particularly in situations where the multipath-propagated signal is delayed only slightly compared with the arrival of a directly propagated signal at the receiver, that is, if the phase difference between the directly propagated signal and the multipath-propagated signal is small. Using the method according to the invention, more reliable synchronization with the desired signal can be maintained, particularly in positioning receivers, wherein more accurate positioning is achieved. Furthermore, the receiver can be implemented with a smaller number of correlators than prior art receivers, while still achieving equally good resolution. A receiver according to the invention can be implemented with a relatively small number of components and the total energy consumption can be kept at a reasonable level compared with a prior art receiver capable of achieving the same resolution, wherein the invention is particularly well suited for use in portable devices. Thus, the positioning receiver can also be implemented in connection with a wireless communication device,

BRIEF DESCRIPTION OF THE DRAWINGS

In the following, the present invention will be described in more detail with reference to the appended drawings, in which.

DETAILED DESCRIPTION

Figure 1:
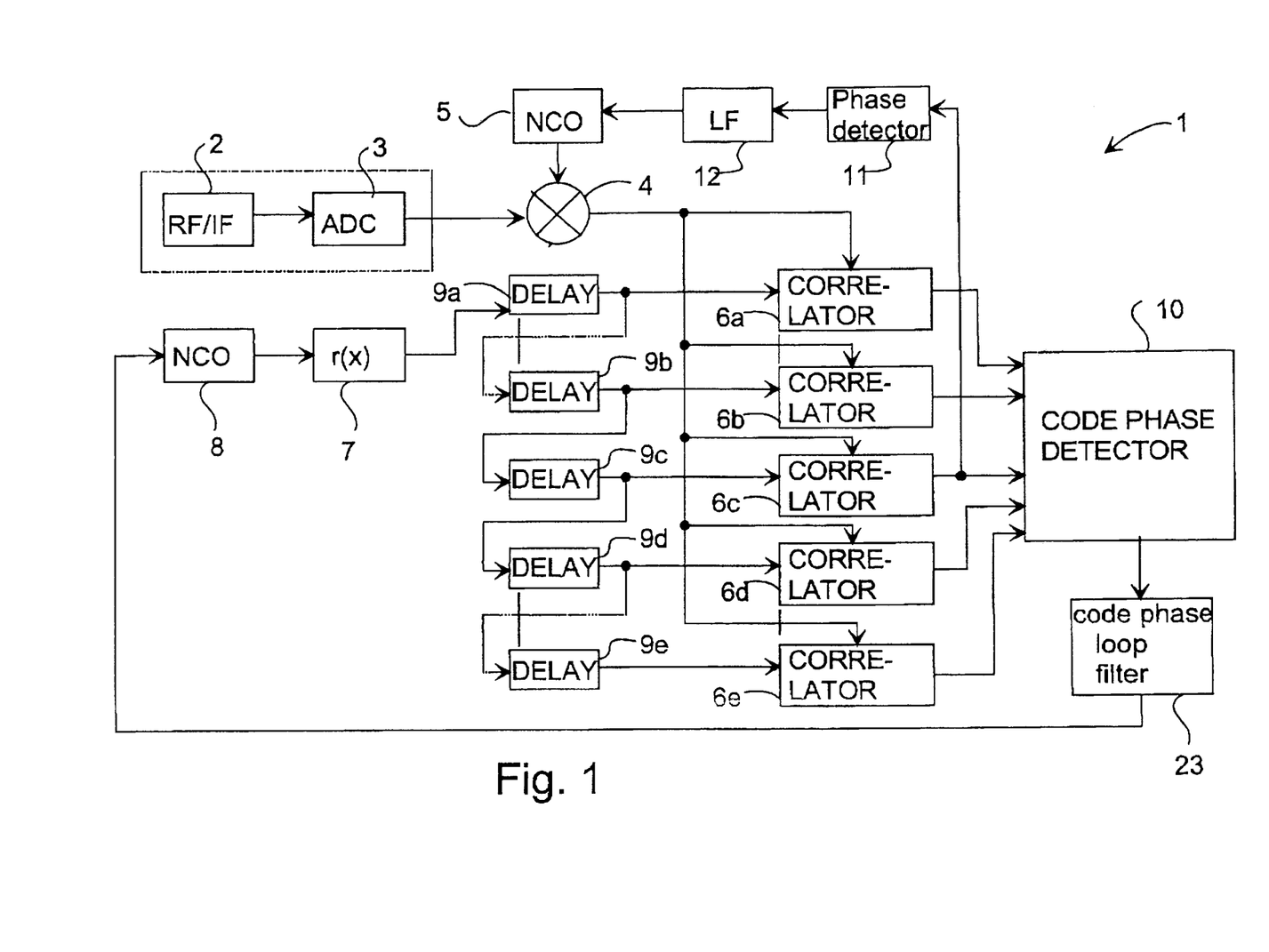
FIG. 1 illustrates, as a simplified block diagram, the signal monitoring block of a positioning receiver, in which the method according to the invention can be applied.

A signal received at the signal tracking block of the receiver 1 of FIG. 1 is preferably converted to an intermediate frequency in a converter block 2. At this stage, in a way known as such, the signal comprises two components, I and Q, which have a phase difference of 90°. However, for the sake of clarity, the I and Q components are not shown separately in FIG. 1. The analogue signal components, converted to the intermediate frequency, are digitized in a digitizing block 3 and supplied to a mixer 4. In the mixer 4, the I and Q components of the digitized signal are multiplied with a signal generated by a first numerically controlled oscillator 5 (NCO). The signal of the first numerically controlled oscillator 5 is intended to correct the frequency deviation caused by Doppler shift and by the frequency error of the receiver's local oscillator (not shown). The signal formed by the mixer 4 is supplied to correlators 6a–6e.

The pseudo-random code used by each satellite used in the positioning system is stored in the receiver 1, or a code r(x) corresponding to the pseudo-random code of the satellite being received at a particular time is generated in a code generator 7, the chipping frequency of which is adjusted using a second numerically controlled oscillator 8. The code signal formed in the receiver is delayed in delay blocks 9a–9e. In this way, a set of code signals having different phases is produced. Each code signal is supplied to a corresponding correlator 6a–6e. Preferably, the delays of the delay blocks 9a–9e are selected to lie at regular intervals in such a way that the total delay is preferably approximately the time required to transmit two chips. The number of delay blocks 9a–9e and correlators 6a–6e affects the accuracy with which the code phase can be determined, but typically in practical solutions, several delay blocks 9a–9e and correlators 6a–6e are used.

Figure 2A:
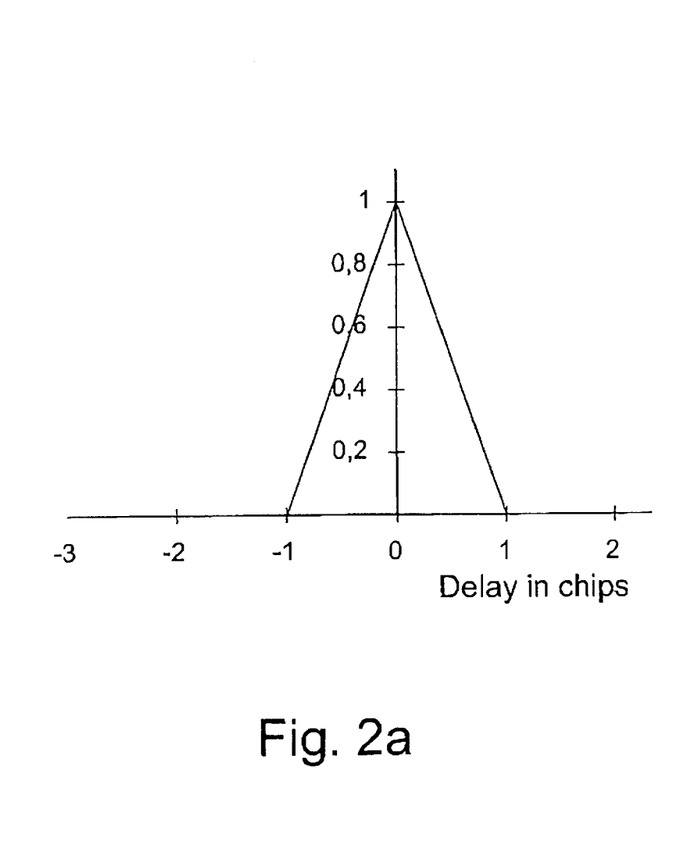
FIG. 2a illustrates an ideal autocorrelation function.
Figure 2B:
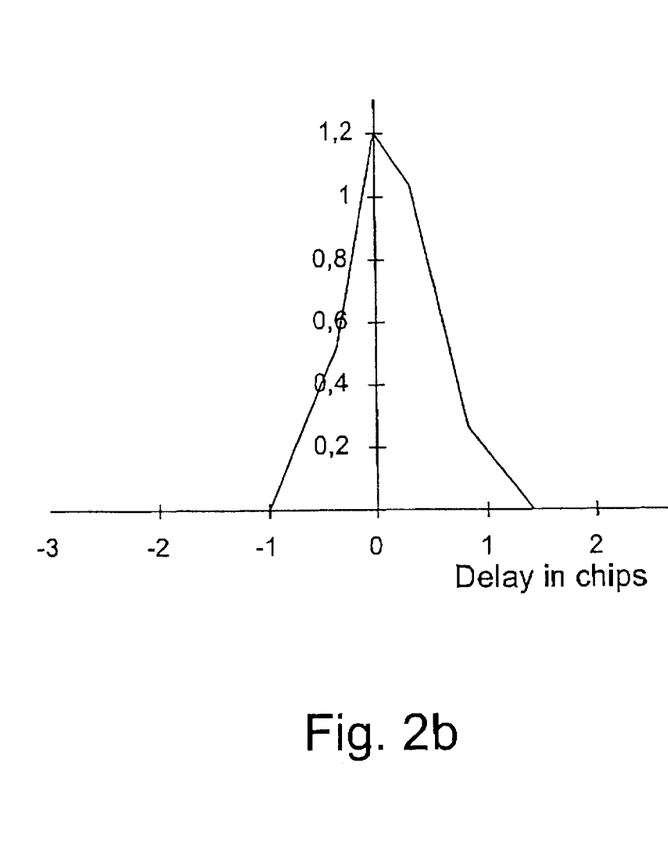
FIG. 2b illustrates the correlation function of FIG. 2a in the presence of a multipath-propagated signal.

In the correlators 6a–6e, a correlation (cross-correlation) between the output signal of the mixer and the different phased code signals is performed. Each correlator 6a–6e generates an output value which indicates the correlation between the received signal and a code signal r(x) with a certain phase, wherein the correlation between the received signal and the different phased code signals can be determined from the outputs of the correlators 6a–6e. The correlator output values are supplied to a code phase detector 10, where it is attempted to determine the correct code phase. In an ideal situation, the correlator output values should produce a correlation result that is an equilateral triangle, an example of which is presented in FIG. 3a. This is based on the fact that in the GPS system, the satellites transmit a signal whose autocorrelation function corresponds to such a triangle. However, multipath propagation causes distortions in the correlator output values. An example of the correlation result for a multipath-propagated signal is shown in FIG. 2b, in which there is one multipath-propagated signal whose strength is −6 dB and whose phase difference is 0.5 chips with respect to the directly propagated signal.

Figure 3A:
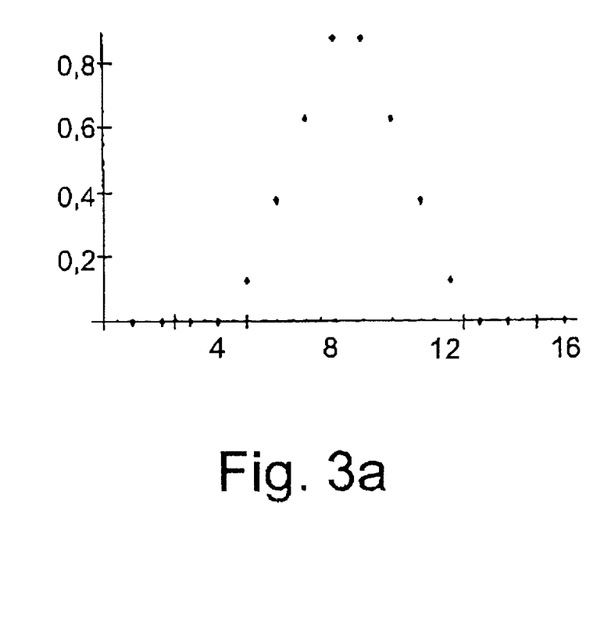
FIG. 3a illustrates the correlator output values in a situation where there is no multipath propagation.
Figure 3B:
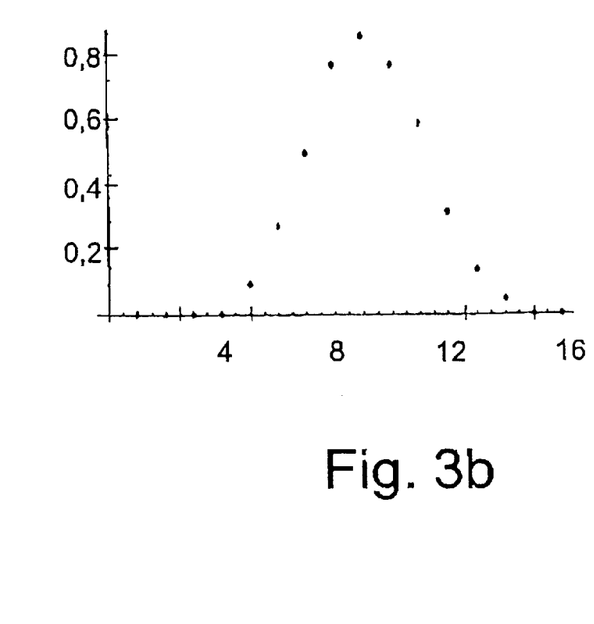
FIG. 3b illustrates the correlator output values in a situation where one multipath-propagated signal is received in addition to the directly propagated signal.

The appended FIG. 3a shows, in an exemplary manner, the correlator output values in an ideal situation, where only a directly propagated signal is received, and, in a corresponding manner, FIG. 3b shows an example of the correlator output values in a situation where one multipath-propagated signal is received in addition to the directly propagated signal. In other words, these are the correlator output values corresponding to the functions in the example situations of FIGS. 2a and 2b. In FIGS. 3a and 3b, the number of samples, or correlator output values is relatively small with respect to the code phase range to be examined (in this example, 16 signals from 16 correlators for the time of two chips). Thus, it is very difficult, if not impossible, for example to determine the differences between a sample set according to FIG. 3b and an ideal situation, such as the sample set according to FIG. 3a. This may cause errors in positioning. The number of samples is affected by the number of correlators 6a–6e. In practical applications, the number of correlators cannot be increased indefinitely, for example to keep the number of components and the power consumption of the receiver at a reasonable level.

The output value of one correlator, preferably the centre correlator 6c, is also used to detect the phase of the carrier in phase detector 11. The signal indicating the phase difference, formed in the phase detector 11, is filtered in a first filter 12 and supplied to the first numerically controlled oscillator 5. Thus, by adjusting the frequency of the first numerically controlled oscillator 5, an attempt is made to keep the receiver locked to the phase of the carrier.

In the exemplary tracking block of FIG. 1, there are 16 correlators, of which only five are shown for clarity. Nevertheless, it is obvious that the number of correlators can be larger to a certain extent, or also smaller than this. In a receiver according to the invention, the power consumption and the number of components can be kept reasonable, in view of VLSI implementation.

Figure 5:
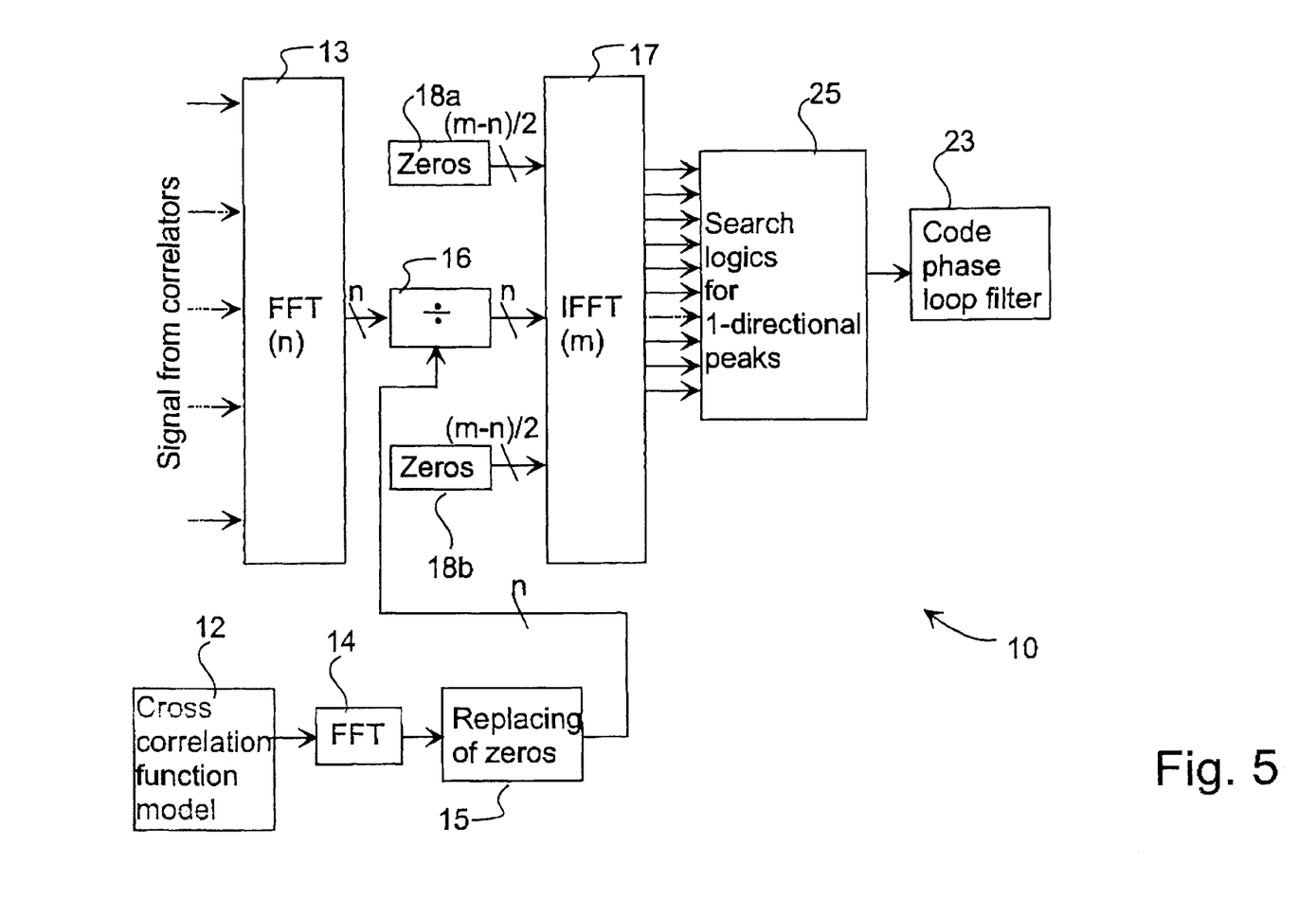
FIG. 5 illustrates a code phase detector according to a preferred embodiment of the invention as a simplified block diagram.

In the following, the operation of a preferred embodiment of the invention in a code phase detector 10 will be described with reference to the block diagram of FIG. 5. A cross-correlation function model 24 is stored in the code phase detector 10, an advantageous example of which is shown in FIG. 2a. Ideally, the cross-correlation function model is an equilateral triangle with a base length of two chips, corresponding to the code length covered by the correlators 6a–6e. This can be justified in the following way. In the GPS system, the code signal chip has two possible values: +1 and −1. When calculating the cross-correlation (autocorrelation) of the code signal and a delayed version of the signal, the code signal and its delayed version are multiplied together, chip by chip. Thus, the average of the different multiplication results lies between +1 and −1. For different phase differences between the code signal and its delayed version, this average is for the most part 0. When the phase difference starts to approach zero, the average starts to approach +1. At the stage when the phase difference is 0, the maximum value +1 is achieved. If the phase difference is changed again, the average starts to decrease in a substantially linear fashion. This can be further illustrated by imaging two similar rectangular pulses sliding over each other and considering the common area of the overlapping pulses. As the pulses move towards each other and start to overlap, the common area starts to grow in a linear fashion, At the stage when the pulses overlap fully, the area is the greatest. After this, the area starts to decrease in a linear fashion and reaches zero when the pulses no longer overlap. The length of the base of the equilateral triangle formed by the common area is twice the length of the pulses. The same phenomenon also occurs in the case of a sequence of pulses.

In the method according to an embodiment of the invention, the equilateral triangle presented above, is used as a cross-correlation function model. However, the form of this equilateral triangle extends over a considerably wider code phase range than would be optimal for evaluating the code phase. In fact, an impulse function would be better for evaluating the code phase, but in practice, an ideal impulse function cannot be achieved. Furthermore, the RF and/or IF stages of the receiver, particularly the filters used therein, distort the triangular form to some extent. These distortions are due to the electronics used to implement the RF and/or IF stages, and are different from the changes introduced by multipath propagation. The distortions can be taken into account when a model of the cross-correlation function is created, wherein another model for the cross-correlation function is a model taking into account the distorting effect of the RF and IF stages.

The equilateral triangle representing the cross-correlation function can also be considered to represent a convolution between an ideal impulse function and a triangular impluse response, performed somewhere in the signal transfer path, such as in the receiver. Because a convolution in the time domain can be implemented as a multiplication in the frequency domain, an impulse in the time domain could be formed, in principle, by dividing the frequency domain transform of the cross-correlation function by the frequency domain transform of the triangular impulse response. However, zero values occur at certain frequencies in the frequency domain transform of the triangular impulse, which would result in division by zero. Thus, a direct division is not possible, but in the method according to the invention the zero values are preferably replaced by small values $\epsilon$.

In the method according to the invention, a time-to-frequency domain transformation, such as a fast Fourier transform (FFT) is performed in a first FFT block 13 of the code phase detector, on a vector formed from the correlator output values (n in number). A time-to-frequency domain transformation is also performed on the cross-correlation function model 24 in a second FFT block 14 to form n transform results. The value n is the same as the number of the correlators 6a–6e, and it is preferably an integer power of two. Furthermore, the Fourier transform result of the cross-correlation function model is modified in such a way that transform values close to zero are set to the predetermined value $\epsilon$. This is illustrated by setting block 15. In a particularly advantageous embodiment of the invention, all values of the Fourier transform result of the cross correlation function model that are smaller than $\epsilon$ are replaced with $\epsilon$. The value $\epsilon$ is very small, but not equal to zero, because this value is used as a divisor, as will be disclosed below. It is obvious that the transform values of the cross-correlation function model 24 can be stored in advance e.g. in the memory means of the receiver (not shown), wherein the second FFT block 14 and the setting block 15 are not necessarily required. In reality, the cross-correlation function is not an ideal equilateral triangle, but the filters of the RF and IF parts round off the triangle. This can be taken into account when forming the correlation function model to be used in deconvolution. In a particularly advantageous embodiment of the invention, the cross correlation function model is formed using a realistic model of the actual correlator outputs in the absence of multipath propagation.

Although the Fourier transform is used primarily as an example of a time-to-frequency transformation in the rest of this description and the inverse Fourier transform as an example of an inverse transformation, i.e. a frequency-to-time transformation, it is obvious that the present invention is not limited solely to these examples.

The first transform values formed by the first FFT block 13 (of which there are n) are divided by the transform values of the cross-correlation function model in divider 16 (also n in number). This is based on the fact that division of the frequency domain representation of the correlator output values by the frequency domain representation of the cross-correlation function model of the correlator corresponds to a deconvolution between the ideal impulse response of the correlator and the impulse response of the real correlator. The above-described steps represent an FFT deconvolution stage, which is preferably followed by interpolation in the following way.

The results of the division are supplied from the divider 16 to an inverse FFT block 17, where the results of the division are transformed into the time domain to form second transform results, in such a way that a number of values m, which is greater than the n values formed by the divider 16, is used in the inverse Fourier transform. The value m is preferably greater than the number of values formed by the divider, the next or a greater power of two The greater the value of m, the greater is the resolution with which the code phase can be determined, which in practice has the same effect as increasing the number of correlators. For example, if the first FFT block 13 uses eight values (n=8=$2^3$), 16 values are used in the inverse Fourier transform (m=16=$2^4$). These extra filler values are preferably set to zero and placed at the beginning and end of the inverse Fourier transform in such a way that they are symmetrically distributed (blocks 18a and 18b in FIG. 5), wherein at the same time the inverse Fourier transform corresponds to $\sin(x)/x$ interpolation in the time domain The function $\sin(x)/x$ corresponds to the impulse response of an ideal low-pass filter. Padding with zeros in the frequency domain is equivalent to an increase in resolution in the time domain, which is known as such.

Figure 3C:
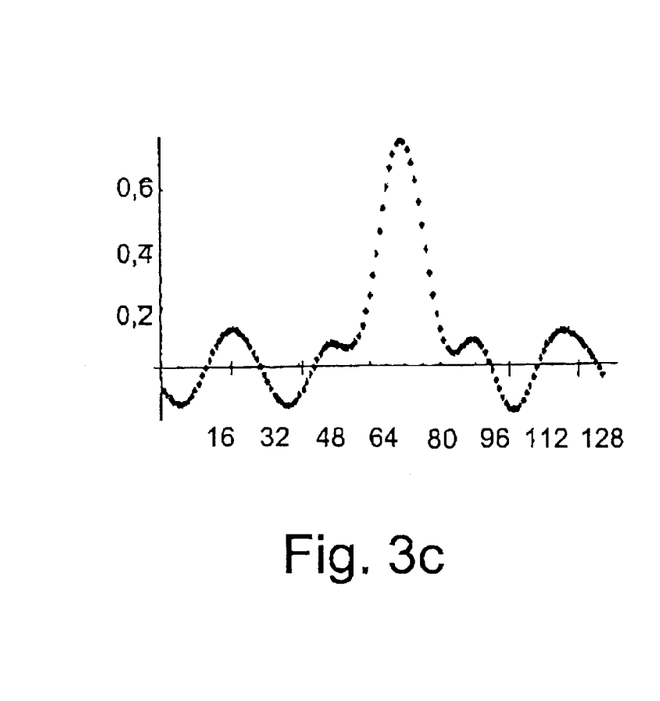
FIG. 3c illustrates transform results deconvoluted and interpolated from the correlator output values in a situation where there is no multipath propagation.
Figure 3D:
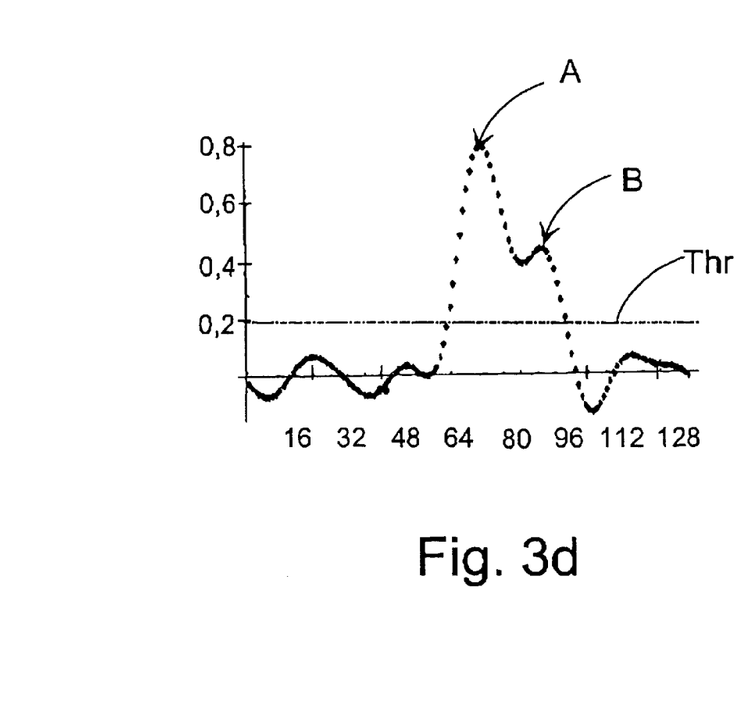
FIG. 3d illustrates transform results deconvoluted and interpolated from the correlator output values in a situation where one multipath-propagated signal is received in addition to the directly propagated signal.

FIG. 3c illustrates the second transform results formed by the inverse FFT block 17 in an ideal situation, and FIG. 3d shows an example of the second transform results in a situation where there is multipath propagation. Comparing FIG. 3c with FIG. 3a and FIG. 3d with FIG. 3b, respectively, it. can be clearly seen that the effect of multipath-propagated signals can be detected significantly better from the transform results of the inverse FFT block 17 obtained using the method according to the invention.

In determination block 25, an analysis of the values formed in the inverse FFT block 17 (one-dimensional determination) is performed to distinguish between the directly propagated signal and multipath-propagated signals. Preferably, in this embodiment, the analysis is performed by defining a threshold value Thr (FIG. 3d), with which each transform result formed in the inverse FFT block 17 is compared. The transform results greater than this threshold value Thr are searched to find maxima A, B, wherein the maximum with the smallest code phase is interpreted as that formed by the directly propagated signal. In the example of FIG. 3d, the maximum denoted by reference A would be selected. This maximum is not necessarily the greatest maximum, because the directly propagated signal may have been attenuated more than a reflected signal. For example, if the receiver is used indoors, the directly propagated signal may have to pass through structures of a building which attenuate the signal, e.g. through the roof and/or walls, and a reflected signal may propagate through structures which attenuate the signal less, for example through a window.

Figure 6:
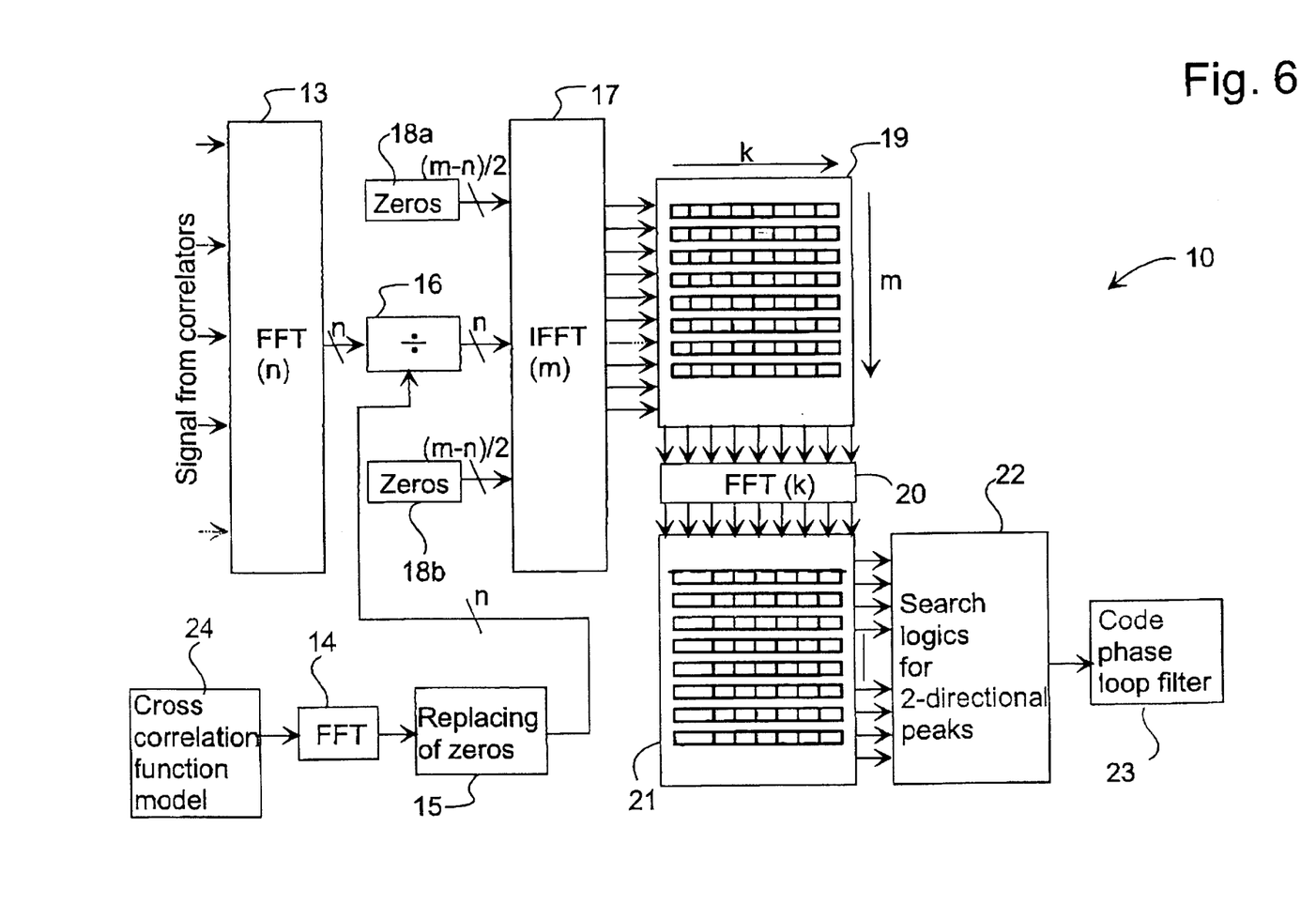
FIG. 6 illustrates a code phase detector according to another preferred embodiment of the invention as a simplified block diagram.

The following is a detailed description of the operation of another advantageous embodiment of the method according to the invention in a code phase detector 10 with reference to the block chart of FIG. 6. The most significant difference between this embodiment and the advantageous embodiment of FIG. 5 is that analysis to distinguish between the directly propagated signal and multipath-propagated signals is not performed directly on the basis of the second transform results formed in the inverse FFT block 17, but additional operations are also performed, as described below.

Because of the movement of the receiver and/or the satellite, multipath-propagated components have a slightly different Doppler shift than the directly propagated signal. This fact can be utilized in an optional frequency analysis stage to achieve still better discrimination of multipath-propagated signals. The second transform results transformed (deconvoluted and interpolated) into the time domain in the inverse FFT block 17 are stored in a first shift register 19 which comprises m rows, each containing k elements. The previously presented steps are repeated k times and the results of successive deconvolutions are stored as a deconvolution matrix, which is an m×k matrix. Each time a transform is performed, one new transform result is stored in each row; that is, the storage is performed in columns.

Figure 4A:
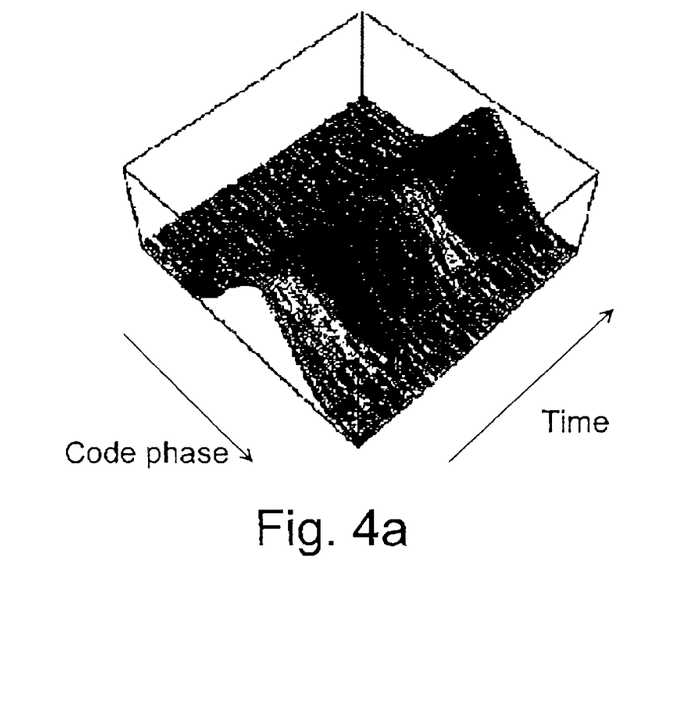
FIG. 4a illustrates the correlator output values (power signal) as a function of time in a situation where there is one Doppler-shifted multipath signal whose code phase difference changes with respect to the directly propagated signal.
Figure 4B:
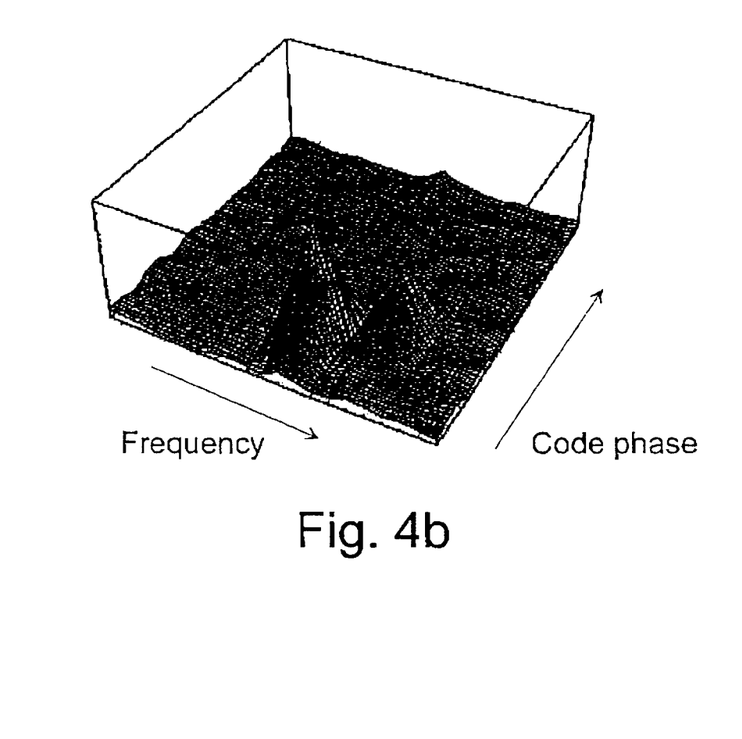
FIG. 4b illustrates an analysis matrix formed, according to a preferred embodiment of the invention, by performing a time-to-frequency transformation on a matrix formed by deconvoluting and interpolating the correlator output values.

After a predetermined number (k) of second transform results has been stored in the first shift register 19, at each repetition a new column of samples formed in the inverse FFT block 17 is stored so as to overwrite the oldest column. The second transform results stored in the first shift register 19, i.e. the deconvolution matrix, are subjected to a Fourier transform, row by row, in a third FFT block 20 to form third transform results. The third transform results are stored in a second shift register 21, in the form of an analysis matrix, which also has m rows and k columns FIG. 4a represents the second transform results of the first shift register 19. The figure presents the output values (power signal) of the correlators as a function of time in a situation where there is one Doppler-shifted multipath signal and the phase difference between the received multipath signal's carrier (and the code modulated to it) and the directly propagated signal changes with time. FIG. 4b shows the third transform results of the second shift register 21, illustrating the analysis matrix formed by the second time-to-frequency transformation i.e. that performed on the content of the first shift register 19 The analysis matrix makes it possible to detect both the code phase and the frequency deviation of a multipath-propagated signal.

Figure 4C:
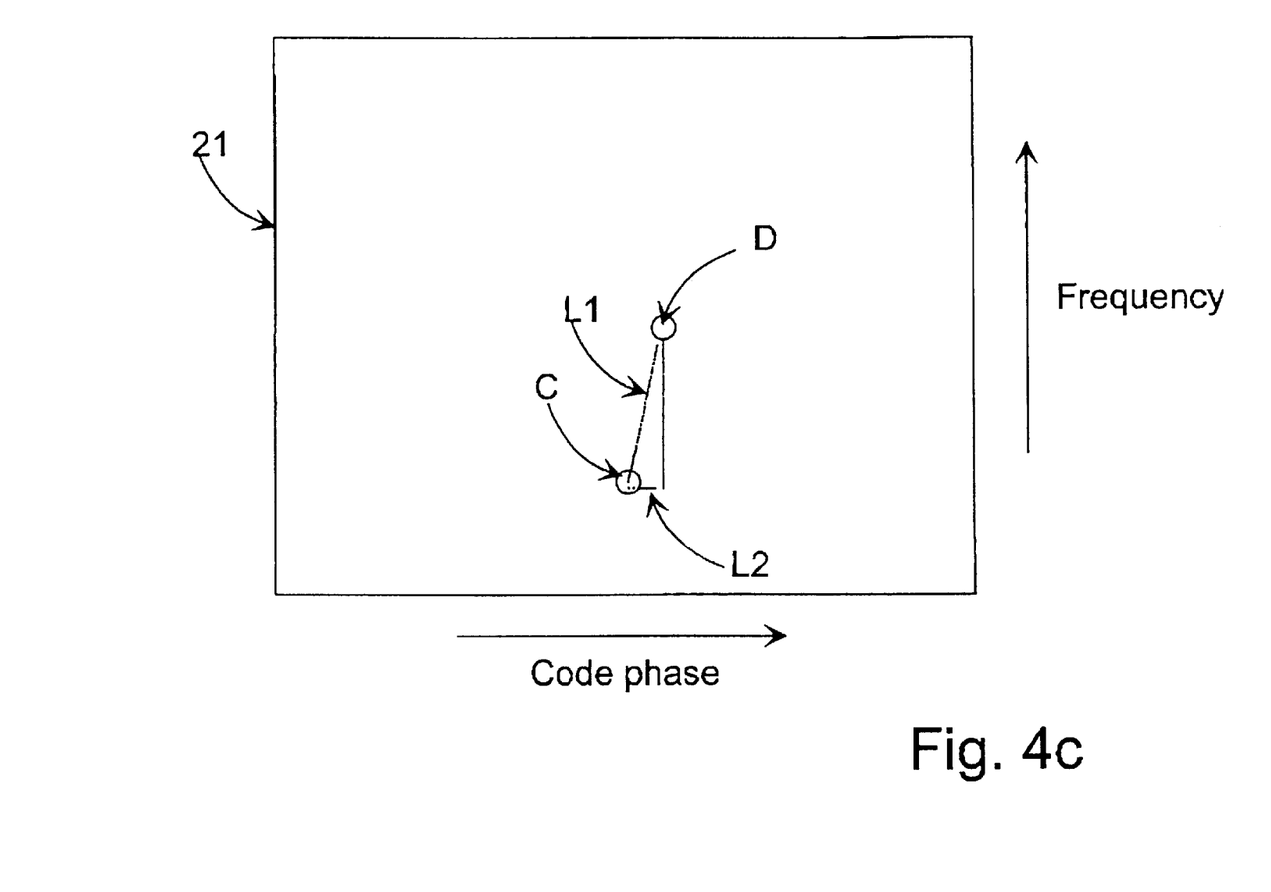
FIG. 4c illustrates, in a simplified manner, a two-dimensional determination stage according to another preferred embodiment of the invention, performed on the basis of the maximum values found in the matrix of FIG. 4b.

Analysis (two-dimensional determination) of the third transform results of the second shift register is performed in determination block 22, to distinguish between the directly propagated signal and multipath-propagated signals. Preferably, this can be performed by setting a threshold value, with which each transform result stored in the second shift register 21 is compared. The transform results greater than this threshold value are searched to find maxima. The directly propagated signal arrives at the receiver before the multipath-propagated signals, which means the maximum with the smallest code phase (delay) is that produced by the directly propagated signal. Detection of the maximum is facilitated because the search can be made in a two-dimensional plane (code phase/frequency deviation), which means that the separation between maxima can be decerned better than if the search were performed only in one dimension. This fact is illustrated in FIG. 4c. FIG. 4c shows two maxima C, D, between which there is both a code phase difference and a frequency deviation. Thus, the distance L1 between the maxima is greater than if the separation were only studied on the basis of the code phase difference (this separation is indicated correspondingly by reference L2 in FIG. 4c).

The row and column index of the detected maximum point can be used to determine both the code phase and the frequency deviation. After the code phase and the frequency deviation have been determined, the receiver 1 can be synchronized and locked to the desired signal on the basis of these values by tuning the second numerically controlled oscillator 8 via a code phase loop filter 23.

Although the second transform results were stored column by column and the analysis was performed row by row above, it is obvious that the storage can be performed row by row and the analysis column by column.

Furthermore, although the previous description dealt with an example situation in which only one multipath-propagated signal was received at the receiver, according to the invention it is possible to distinguish a large number of multipath-propagated signals simultaneously at the receiver. Thus, it is possible to distinguish the directly propagated signal from multipath-propagated signals even in situations where the signal is reflected from several different surfaces, such as the walls of buildings surrounding streets in a city.

The repetition rate of the deconvolution, as well as the number of samples (k) in each row of the shift register affect the frequency resolution and the frequency range of the analysis. Specifically, increasing the repetition rate and the number of samples increases the frequency resolution of the analysis.

Only the operation of the tracking block of a positioning receiver was presented above, but practical receivers also comprise e.g. positioning functions which can comply with prior art, known as such.

To calculate its position, a receiver preferably receives signals from at least four satellites. Thus, the above presented steps are repeated, as necessary, for each satellite signal.

The majority of blocks required to apply the method can be implemented e.g. in a digital signal processor (not shown). The FFT transforms can be performed using either hardware-based solutions or software implementations in the digital signal processor. Furthermore, a control means, preferably a microprocessor or the like, can be used to control the operation of the receiver; however, this is not presented in the appended drawings and is prior art to a person skilled in the art.

Figure 7:
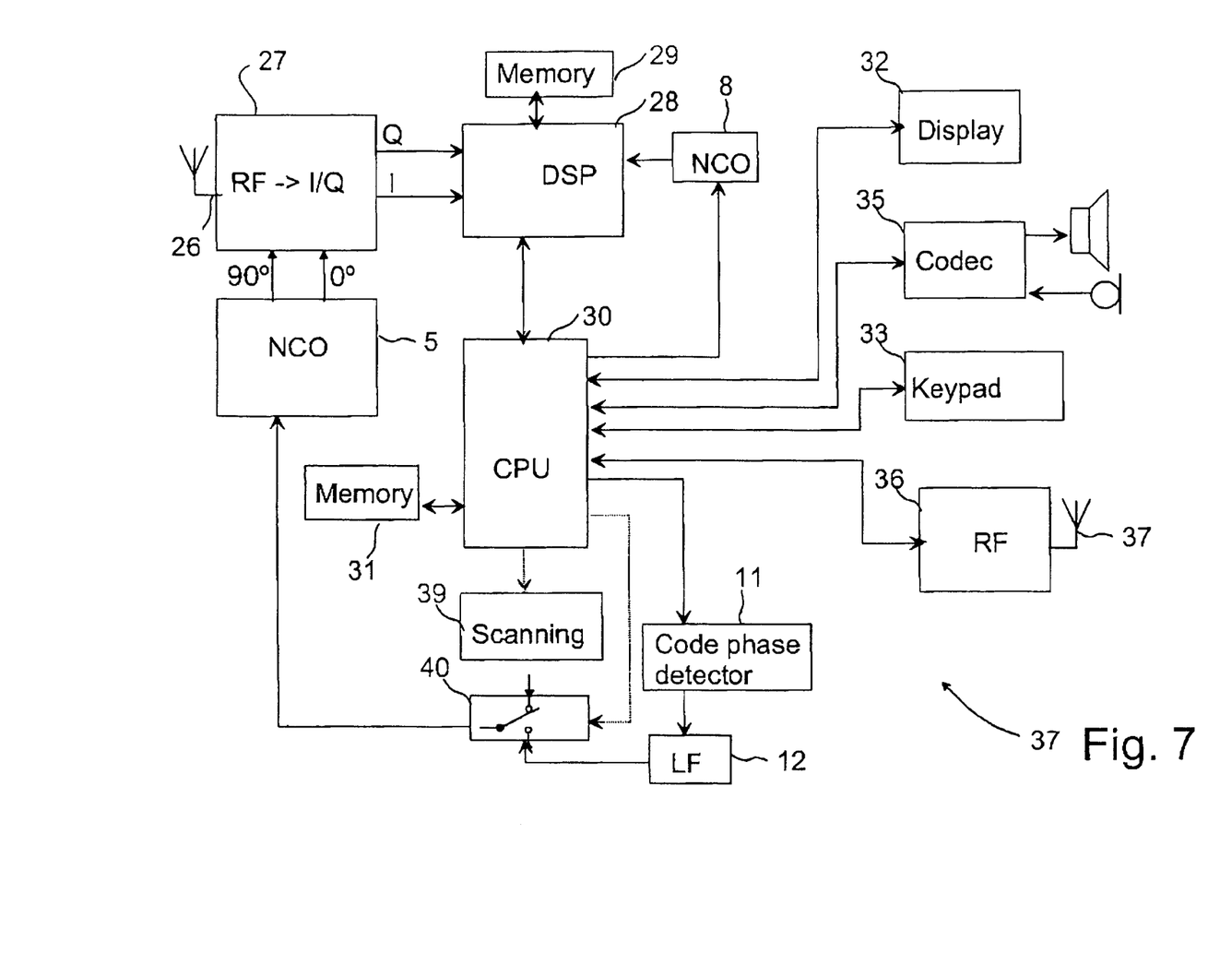
FIG. 7 illustrates an electronic device according to a preferred embodiment of the invention as a simplified block diagram.

The appended FIG. 7 further shows an electronic device 37 according to an advantageous embodiment of the invention, which comprises functions of a wireless communication device and a positioning receiver. A first antenna 26 is used to receive a signal transmitted from positioning satellites. The received signal is supplied to a first radio part 27, in which the signal is converted to an intermediate frequency and digitized. The first radio part comprises e.g. the converter block 2, the digitizer block 3 and the multiplier block 4 of the receiver illustrated in FIG. 1. The digitized signal, which at this stage preferably comprises I and Q components, is supplied to a digital signal processing unit 28, in which e.g. the previously presented correlations with the different phases of the code signal r(x) are performed. The electronic device 37 also comprises first memory means 29 which comprise e.g. a random access memory for storing data required during the operation of the receiver, as well as preferably also a read only memory and/or a non-volatile random access memory for storing the program code of the digital signal processing unit 28. In this embodiment, for example, part of the functions of the control block 10, such as the FFT transform blocks 13, 20, the divider 16, and the inverse FFT block 17, are implemented in the signal processing unit 28. The digital signal processing unit 28 preferably also comprises the shift registers 19, 21, the correlators 6a–6e, as well as the delay blocks 9a–9e. It is obvious that at least some of said functional blocks can also be implemented in another way known as such. For example, the FFT transform blocks 13, 20 and the inverse FFT transform block 17 can also be implemented using integrated circuits, or the like, designed for these purposes. Moreover, the shift registers 19, 21 can be implemented with integrated circuits or in the memory means 29.

The digital signal processing unit 28 supplies the values to be used in the determination block 22, 25 to determine the code phase and the frequency deviation to a processor block 30 which comprises e.g. a microprocessor and I/O logic. The processor block 30 controls a scanning block 39 as well as a first switch 40 which is, after synchronization to the signal to be received (acquisition), turned to a second position to initiate the carrier and code phase locking function. Some functions of the tracking block 10, such as the determination block 22, 25, are preferably implemented at least in part as program commands in the processor block. Second memory means 31 are used as the data memory and the program memory for the processor block 30. It is obvious that the first memory means 29 and the second memory means 31 can also comprise a common memory. Positioning information can be displayed to the user on display 32.

Functions of the wireless communication device are also implemented in the application software of processor block 30. Thus, the display 32 can also be used, in a way known as such, to display e.g. call information. Using a keypad 33, the user can control the positioning receiver as well as the wireless communication device. A codec 34 is used to encode and decode audio signals. FIG. 7 also shows a radio part 35 and a second antenna 36 for the wireless communication device.

The present invention is not limited solely to the above presented embodiments, but it can be modified within the scope of the appended claims.

What is claimed is:

1. A method for reducing the effect of multipath propagation of a code-modulated spread-spectrum signal on the identification of a directly propagated signal component, said multipath propagation occurring during transmission of said code-modulated spread-spectrum signal over a wireless link from a transmitter to a receiver, the method comprising performing the following steps at the receiver:

receiving the code-modulated spread-spectrum signal, using at least one reference code (r(x)) corresponding to a code used in modulation of the code-modulated spread-spectrum signal to form n reference signals having different code phases, and performing a correlation between the received signal and each of the n reference signals thus formed to produce n correlation values representative of a cross-correlation function, characterized in that the method further comprises the steps of:

performing a first time-to-frequency domain transformation on the n correlation values to form n first transform results, forming a frequency-domain divider function representative of a cross-correlation function that would be obtained by said correlation step in the absence of multipath propagation and performing a deconvolution step, by dividing said first transform results by said divider function to form a division result comprising n values.

2. The method according to claim 1, characterized in that it further comprises the following steps:

a padding step, in which the division result formed in the deconvolution step is supplemented with a number of filler values, an interpolation step, in which a frequency-to-time domain transformation is performed on the values of the padded division result to form m second transform results, and a determination step to determine the code phase of the directly propagated signal component of the received signal on the basis of said m second transform results.

3. The method according to claim 2, characterized in that in the determination step, the m second transform results are searched to identify one or more maxima exceeding a predefined threshold level, wherein the maximum corresponding to the smallest code phase is interpreted as being indicative of the code phase of the directly propagated signal component of the received signal.

4. The method according to claim 1, characterized in that it further comprises the following steps:

a padding step, in which the division result formed in the deconvolution step is supplemented with a number of filler values, an interpolation step, in which a frequency-to-time domain transformation is performed on the values of the padded division result to form m second transform results, the method further comprising:

repeating said deconvolution step, padding step and interpolation step form k sets of m second transform results, storing the m second transform results formed at each repetition in the form of a deconvolution matrix having m rows and k columns, performing a frequency analysis step, in which each of the m rows of the deconvolution matrix, comprising k values, is subjected to a second time-to-frequency domain transformation so as to form k third transform results for each row, storing the k third transform results formed for each of the m rows of the deconvolution matrix in the form of an analysis matrix having m rows and k columns, and searching for maximum values in said analysis matrix to determine the directly propagated signal component of the received signal.

5. The method according to claim 4, characterized in that the third transform results stored in the analysis matrix are searched to identify one or more maxima exceeding a predefined threshold level, wherein an identified maximum having the smallest code phase of all identified maxima is interpreted as being indicative of a code phase of the directly propagated signal component of the received signal.

6. The method according to claim 5, characterized in that determination of the smallest code phase is made in two dimensions, on the basis of the code phase and frequency of the third transform results stored in said analysis matrix.

7. The method according to claim 1, characterized in that said first time-to-frequency domain transformation is a Fourier transform.

8. The method according to claim 4, characterized in that said second time-to-frequency domain transformation is a Fourier transform.

9. The method according to claim 2, characterized in that said filler values are zeros.

10. The method according to claim 2, characterized in that said filler values are placed in the initial and final parts of the division result in such a way that they are symmetrically distributed.

11. The method according to claim 2, characterized in that n is an integer power of two m and is the next larger or a higher power of two than n and m−n filler values are added in said padding step.

12. The method according to claim 1, characterized in that said divider function is formed by:

forming a cross-correlation function model;

performing a time-to-frequency domain transformation on said cross-correlation function model; and replacing values of the time-to-frequency domain transformation result of the cross-correlation function model less than a predetermined threshold value ($\epsilon$) with said threshold value ($\epsilon$).

13. The method according to claim 12, characterized in that said cross-correlation function model is an equilateral triangle.

14. The method according to claim 12, in which the received signal is transferred via RF stages of the receiver, characterized in that said cross-correlation function model takes into account at least the effects of said RF stages on the received signal.

15. The method according to claim 12, in which said received signal is transferred via IF stages of the receiver, characterized in that said cross-correlation function model takes into account at least the effects of said IF stages on the received signal.

16. The method according to claim 12, characterized in that said divider function is pre-calculated and stored in the receiver.

17. The method according to claim 1, characterized in that two or more spread spectrum signals are received, wherein the steps of the method are repeated for each spread spectrum signal received.

18. The method according to claim 17, characterized in that a directly propagated signal component is searched for from each of the signals received.

19. The method according to claim 1, characterized in that said frequency-to-time domain transformation is an inverse Fourier transform.

20. The method according to claim 1, characterized in that said filler values are zeros.

21. The method according to claim 4, characterized in that said filler values are placed in the initial and final parts of the division result in such a way that they are symmetrically distributed.

22. The method according to claim 4, characterized in that n is an integer power of two and m is the next larger or a higher power of two than n and m−n filler values are added in said padding step.

23. The method according to claim 2, characterized in that two or more spread spectrum signals are received, wherein the steps of the method are repeated for each spread spectrum signal received.

24. The method according to claim 4, characterized in that two or more spread spectrum signals are received, wherein the steps of the method are repeated for each spread spectrum signal received.

25. The method according to claim 23, characterized in that a directly propagated signal component is searched for from each of the signals received.

26. The method according to claim 24, characterized in that a directly propagated signal component is searched for from each of the signals received.

27. The method according to claim 4, characterized in that said frequency-to-time domain transformation is an inverse Fourier transform.

28. A wireless receiver for receiving a code-modulated spread-spectrum signal, the receiver being configured to reduce the effect of multipath propagation of the code-modulated spread-spectrum signal on the identification of a directly propagated signal component, said multipath propagation occurring during transmission of said code-modulated spread-spectrum signal from a transmitter to the receiver, the receiver comprising:

a delay generator for forming n reference signals having different code phases on the basis of at least one reference code (r(x)) corresponding to a code used in the modulation of the code-modulated spread-spectrum signal, and a correlator for performing a correlation between the received signal and each of the n reference signals formed by the delay generator to produce n correlation values representative of a cross-correlation function, characterized in that the receiver further comprises:

a time-to-frequency domain transformer for performing a first time-to-frequency domain transformation on the n correlation values to form n first transform results, a divider function forming unit for forming a frequency-domain divider function representative of a cross-correlation function that would be obtained by the correlator in the absence of multipath propagation, and a deconvolution unit for dividing said first transform results by said divider function to form a division result comprising n values.

29. The receiver according to claim 28, characterized in that it further comprises:

a padder for adding a number of filler values to the division result formed by the deconvolution unit, an interpolator for performing a frequency-to-time domain transformation on the values of the padded division result to form m second transform results, and a searcher for determining the code phase of said directly propagated component of the received signal on the basis of said m second transform results.

30. The receiver according to claim 29, characterized in that the searcher is configured to search the m second transform results to identify one or more maxima exceeding a predefined threshold level, and is adapted to interpret an identified maximum having the smallest code phase of all identified maxima as being indicative of the code phase of the directly propagated component of the received signal.

31. The receiver according to claim 28, characterized in that it further comprises:

a padder for adding a number of filler values to the division result formed by the deconvolution unit, an interpolator for performing a frequency-to-time domain transformation on the values of the padded division result to form m second transform results, said deconvolution unit, said padder and said interpolator being configured to operate repeatedly to form k sets of m second transform results, the receiver further comprising:
- a memory for storing the m second transform results formed at each repetition in the form of a deconvolution matrix having m rows and k columns,
- a frequency analyser for applying a second time-to-frequency domain transformation to each of the m rows of the deconvolution matrix comprising k values so as to form k third transform results for each row,
- a memory for storing the k third transform results formed for each of the m rows of the deconvolution matrix in the form of an analysis matrix having m rows and k columns, and
- a searcher for searching for maximum values in said analysis matrix to determine the directly propagated signal component of the received signal.

32. The receiver according to claim 31, characterized in that the searcher is configured to search the third transform results stored in the analysis matrix to identify one or more maxima exceeding a predefined threshold level, and is adapted to interpret an identified maximum having the smallest code phase of all identified maxima as being indicative of the code phase of the directly propagated component of the received signal.

33. The receiver according to claim 32, characterized in that the searcher is adapted to determine the smallest code phase by performing a search in two dimensions, on the basis of the code phase and frequency of the third transform results stored in said analysis matrix.

34. The receiver according to claim 28, characterized in that said first time-to-frequency domain transformation is a Fourier transform.

35. The receiver according to claim 31, characterized in that said second time-to-frequency domain transformation is a Fourier transform.

36. The receiver according to claim 29, characterized in that said filler values are zeros.

37. The receiver according to claim 29, characterized in that said padder is adapted to place said filler values in the initial and final parts of the division result in such a way that they are symmetrically distributed.

38. The receiver according to claim 29, characterized in that n is an integer power of two and m is the next larger or a higher power of two than n and said padder is adapted to add m−n filler values to the division result.

39. The receiver according to claim 28, characterized in that said divider function forming unit is adapted to form said divider function by:
- forming a cross-correlation function model;
- performing a time-to-frequency domain transformation on said cross-correlation function model; and
- replacing values of the time-to-frequency domain transform result of the cross-correlation function model less than a predetermined threshold value ($\epsilon$) with said threshold value ($\epsilon$).

40. The receiver according to claim 39, characterized in that said cross-correlation function model is an equilateral triangle.

41. The receiver according to claim 39, in which the received signal is transferred via RF stages of the receiver, characterized in that said cross-correlation function model takes into account at least the effects of said RF stages on the received signal.

42. The receiver according to claim 39, in which the received signal is transferred via IF stages of the receiver, characterized in that said cross-correlation function model takes into account at least the effects of said IF stages on the received signal.

43. The receiver according to claim 28, characterized in that said divider function is pre-calculated and stored in the receiver.

44. The receiver according to claim 28, characterized in that it is a GPS receiver.

45. The receiver according to claim 29, characterized in that said frequency-to-time domain transformation is an inverse Fourier transform.

46. The receiver according to claim 28, characterized in that it is provided in a wireless communication device.

47. The receiver according to claim 31, characterized in that said filler values are zeros.

48. The receiver according to claim 31, characterized in that said padder is adapted to place said filler values in the initial and final parts of the division result in such a way that they are symmetrically distributed.

49. The receiver according to claim 31, characterized in that n is an integer power of two and m is the next larger or a higher power of two than n and said padder is adapted to add m−n filler values to the division result.

50. The receiver according to claim 31, characterized in that said frequency-to-time domain transformation is an inverse Fourier transform.

51. An electronic device comprising a wireless receiver for receiving a code-modulated spread-spectrum signal, the receiver being configured to reduce the effect of multipath propagation of the code-modulated spread-spectrum signal on the identification of a directly propagated signal component, said multipath propagation occurring during transmission of said code-modulated spread-spectrum signal from a transmitter to the receiver, the receiver comprising:
- a delay generator for forming n reference signals having different code phases on the basis of at least one reference code ($r(x)$) corresponding to a code used in modulation of the code-modulated spread-spectrum signal, and
- a correlator for performing a correlation between the received signal and each of the n reference signals formed by the delay generator to produce n correlation values representative of a cross-correlation function, characterized in that the receiver of the electronic device also comprises:
- a time-to-frequency domain transformer for performing a first time-to-frequency domain transformation on the n correlation values to form n first transform results,
- a divider function forming unit for forming a divider function representative of a cross-correlation function that would be obtained by the correlator in the absence of multipath propagation, and
- a deconvolution unit for dividing said first transform results by said divider function to form a division result comprising n values.

52. The electronic device according to claim 51, characterized in that the receiver further comprises:
- a padder for adding a number of filler values to the division result formed by the deconvolution unit;
- an interpolator for performing a frequency-to-time domain transformation on the values of the padded division result to form m second transform results; and
- a searcher for determining the code phase of said directly propagated component of the received signal on the basis of said m second transform results.

53. The electronic device according to claim 51, characterized in that it also comprises means for performing functions of a mobile communication device.

54. The electronic device according to claim 52, characterized in that the searcher is configured to search the m second transform results to identify one or more maxima exceeding a predefined threshold level, and is adapted to interpret an identified maximum having the smallest code phase of all identified maxima as being indicative of the code phase of the directly propagated component of the received signal.

55. The electronic device according to claim 51, characterized in that the receiver further comprises:

- a padder for adding a number of filler values to the division result formed by the deconvolution unit,
- an interpolator for performing a frequency-to-time domain transformation on the values of the padded division result to form m second transform results,
- said deconvolution unit, said padder and said interpolator being configured to operate repeatedly to form k sets of m second transform results, the receiver further comprising:
- a memory for storing the m second transform results formed at each repetition in the form of a deconvolution matrix having m rows and k columns,
- a frequency domain analyser for applying a second time-to-frequency transformation to each of the m rows of the deconvolution matrix comprising k values so as to form k third transform results for each row,
- a memory for storing the k third transform results formed for each of the m rows of the deconvolution matrix in the form of an analysis matrix having m rows and k columns, and
- a searcher for searching for maximum values in said analysis matrix to determine the directly propagated signal component of the received signal.

56. The electronic device according to claim 55, characterized in that the searcher is configured to search the third transform results stored in the analysis matrix to identify one or more maxima exceeding a predefined threshold level, and is adapted to interpret an identified maximum having the smallest code phase of all identified maxima as being indicative of the code phase of the directly propagated component of the received signal.

* * * * *